United States Patent

[11] 3,617,891

[72] Inventor Dennis Henry Covill
Nova Scotia, Canada

[21] Appl. No. 827,663
[22] Filed May 26, 1969
[45] Patented Nov. 2, 1971
[73] Assignee E.M.I. Electronics Canada Limited
Nova Scotia, Canada

[54] OPTIMUM FREQUENCY DETERMINING RADIO COMMUNICATION SYSTEM

8 Claims, 2 Drawing Figs.

[52] U.S. Cl. .......... 325/53, 325/56, 325/64, 343/179
[51] Int. Cl. .......... H04b 1/50, H04l 7/00
[50] Field of Search .......... 325/52, 56 SB, 63, 64; 343/175, 177, 179

[56] References Cited

UNITED STATES PATENTS

| | | | |
|---|---|---|---|
| 2,521,696 | 9/1950 | De Armond .......... | 325/56 |
| 3,151,295 | 9/1964 | Haviland .......... | 325/53 |
| 3,160,813 | 12/1964 | Biggi et al. .......... | 325/56 |
| 3,443,228 | 5/1969 | Brenner et al. .......... | 325/56 |
| 3,483,472 | 12/1969 | Kinel et al. .......... | 325/56 |

*Primary Examiner*—Robert L. Griffin
*Assistant Examiner*—James A. Brodsky
*Attorney*—William W. Downing, Jr.

ABSTRACT: A radio communication system is disclosed in which a transmitter transmits a carrier wave modulated by intelligence to a receiver for receiving the carrier wave, transmission is interrupted at intervals and the optimum frequency in a range of frequencies for the carrier wave is determined with the aid of the transmitter and the receiver during the interruptions. If the optimum carrier frequency differs from that previously in use the carrier wave is switched to the optimum frequency and transmission is then resumed. A clock initiates the interruptions at regular intervals, and the interruptions are delayed until a break occurs in the traffic.

OPTIMUM FREQUENCY DETERMINING RADIO COMMUNICATION SYSTEM

Figure 1:
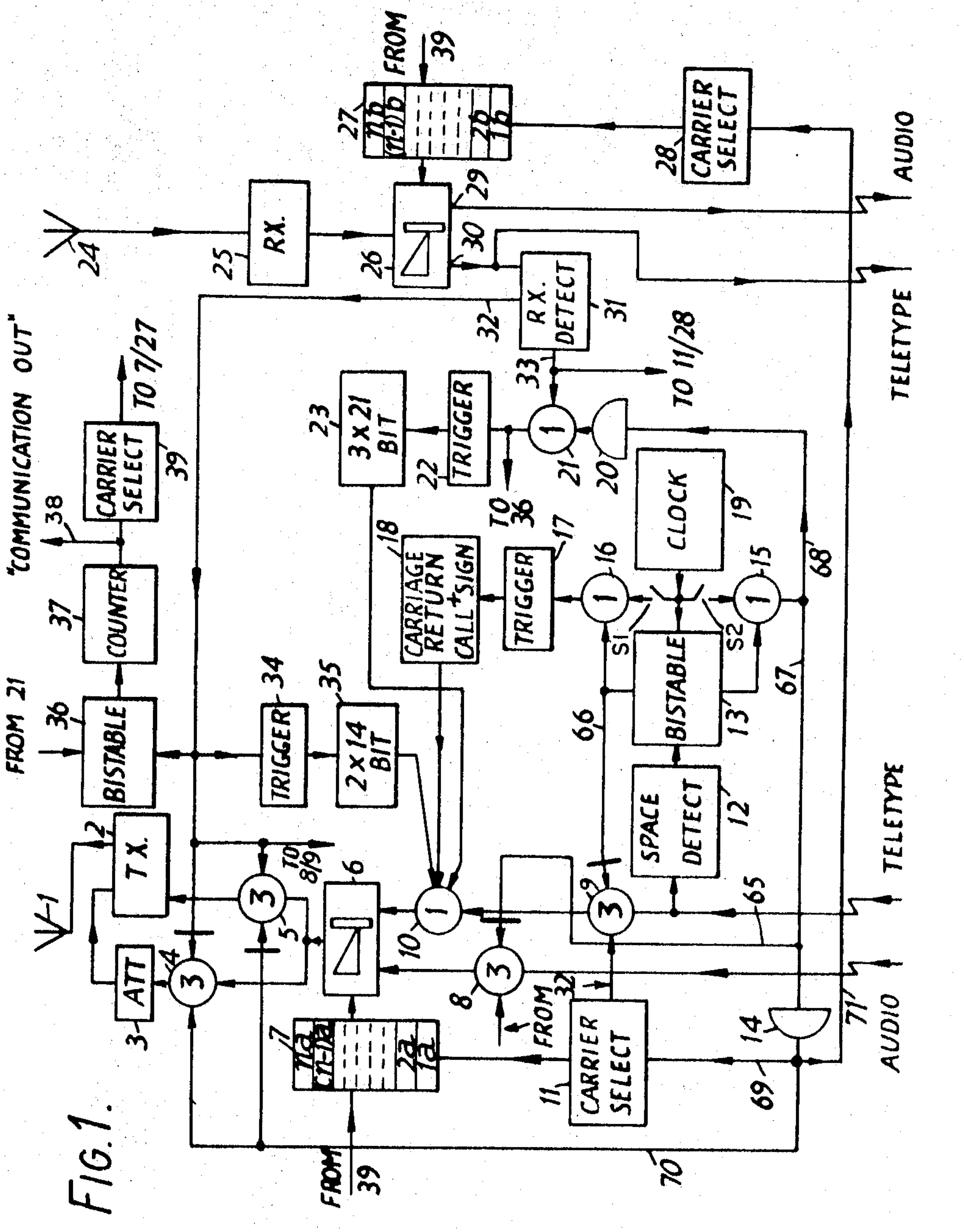

This invention relates to an optimum frequency determining radio communication system.

Many radio communication systems, required to provide communication over long distances, depend on ionospheric refraction to achieve propagation of the radio waves. One disadvantage of such systems is the need to select the carrier frequency according to the prevailing ionospheric propagation conditions. This disadvantage can be reduced by providing additional means for periodically determining the optimum carrier frequency for communication, so that frequency can be changed as required. However the provision of such additional means tends to be economically justified only in communication systems handling a large volume of traffic, or in military systems. The disadvantage is also avoided in satellite communication systems but such systems are only economically viable in special circumstances.

The object of the present invention is to provide an improved radio communication system which depends on ionospheric refraction for propagation, with a view to reducing the disadvantage indicated in the preceding paragraph.

According to the present invention from one aspect there is provided a radio communication system including a transmitter for transmitting a carrier wave modulated by intelligence, a receiver for receiving said carrier wave, means for interrupting transmission at intervals, means for determining with the aid of said transmitter and said receiver during the interruptions the optimum frequency for said carrier wave in a range of frequencies, means for switching said carrier wave to said frequency when transmission is resumed, if the frequency differs from that previously in use, and means for continuing operation of said determining means on inability to determine an optimum frequency, said continuing means comprising means operative for adapting said transmitter to transmit test signals at each of a plurality of discrete frequencies in said range of frequencies taken at one rate, and means operative for rendering the receiver responsive to said plurality of discrete frequencies taken at a substantially different rate, thereby to avoid the need to synchronize the changes in frequency at the transmitter and receiver.

According to the present invention from another aspect there is provided a radio communication system including a transmitter for transmitting a carrier wave modulated by intelligence, a receiver for receiving said carrier wave, means for interrupting transmission at intervals, said interrupting means comprising clock means adapted to initiate the interruptions at regular intervals and means for delaying the interruptions until a break occurs in the traffic being transmitted, means for determining with the aid of said transmitter and said receiver during the interruptions the optimum frequency for said carrier wave in a range of frequencies, and means for switching said carrier wave to said frequency when transmission is resumed, if the frequency differs from that previously in use.

Figure 2:
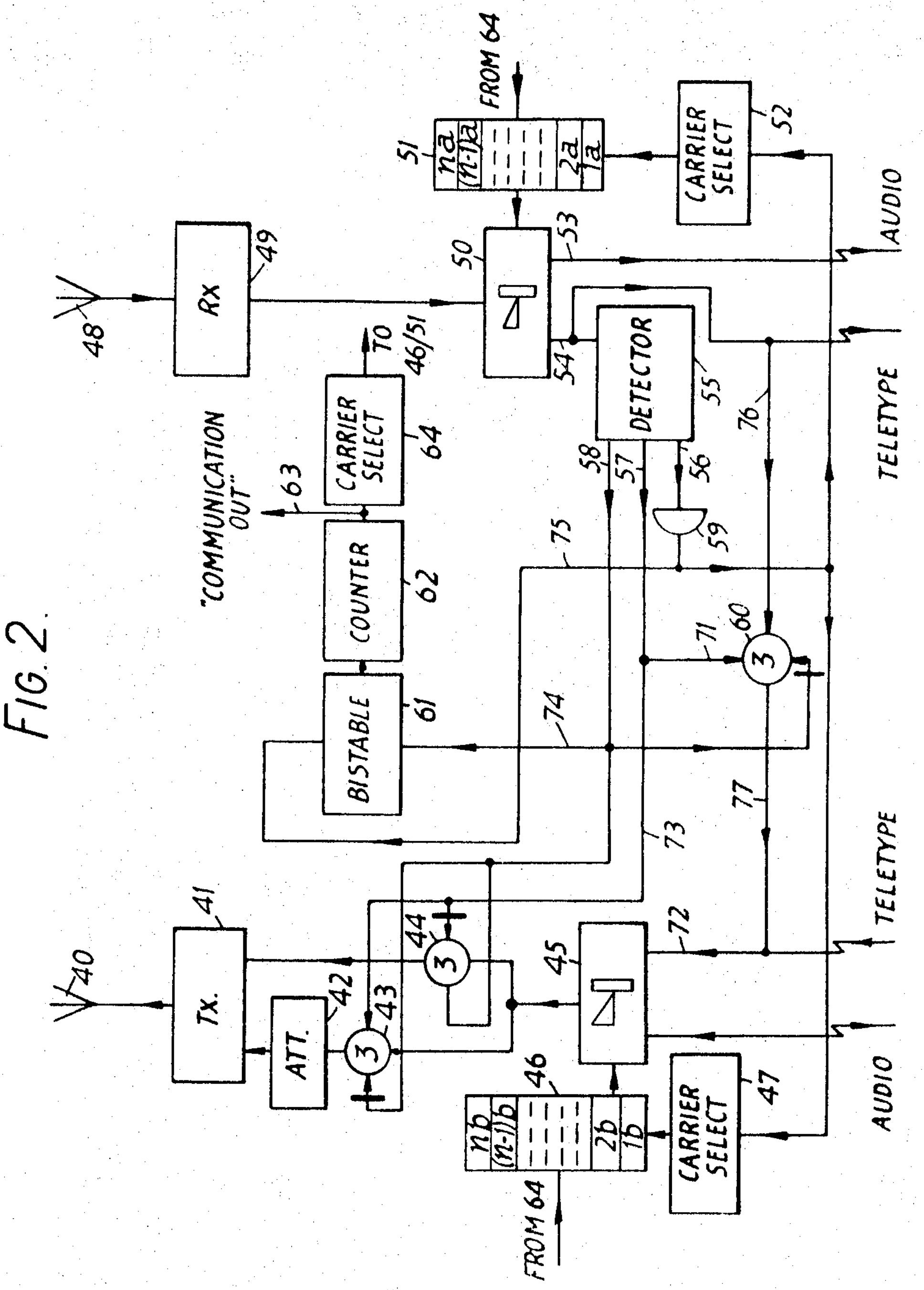

In order that the invention may be fully understood and readily carried into effect it will now be described with reference to the accompanying drawings of which:

FIG. 1 shows a block diagram of one part of a communication system according to the present invention, designated "station A," and FIG. 2 shows a block diagram of another part of a communication system according to the present invention, designated "station B."

The system according to this example is arranged for communication in both directions between two stations designated A and B. The two stations may be up to 5,000 miles apart and capable of passing simultaneous communications in both directions at a nominal peak envelope power of 3,000 watts. In normal conditions, communication in either direction is by means of a modulated carrier wave, and audio and teletype signals can be transmitted by means of the upper and lower side bands respectively of the carrier wave. The frequency of the carrier wave for communicating from A to B is different from but close to the frequency of the carrier wave for communicating from B to A. The carrier frequencies are determined by frequency-evaluating means which selects the optimum carrier frequencies from one of *n* different pairs of frequencies. The normal condition of the system is that which allows communication by means of the teletype and audio channels, but the aforesaid-evaluating means is arranged automatically to interrupt normal communication at intervals of say 5 minutes and to effect a determination of the optimum pairs of frequencies for the carrier waves for the transmitter at A and the transmitter at B.

The operation of the evaluation means takes place as follows, referring first to FIG. 1 which shows a station A. Audio signals are passed through a "three-input" AND-gate 8; and teletype signals through a "three-input" AND-gate 9 and an OR-gate 10 to block 6, which includes frequency-translating means so as to derive a radio frequency signal to be transmitted. Carrier frequencies for the final stage of said frequency translating are derived from a bank of oscillators 7, which provides outputs at frequencies from 1*a* to *na* say, so that the output signal from block 6 comprises a carrier wave at a frequency in the range 1*a* to *na* modulated with either audio or teletype signals or both. In order that frequency-evaluating means may operate, normal communication is interrupted by closing either gate 8 or 9 as follows. Assuming audio signals are being transmitted, then a clock 19 provides a pulse through an OR-gate 15 to shut gate 8 via paths 67 and 65, say every 5 minutes assuming teletype signals are being transmitted, then clock 19 sets a bistable 13, which is cleared as soon as a space detector 12 detects a space in the incoming teletype signals, upon which said bistable 13 provides a pulse to shut gate 9 via path 66. Simultaneous with the shutting of either gate 8 or gate 9, another pulse from either clock 19 or bistable 13 is fed through an OR-gate 16 to a trigger circuit 17 which triggers an output, from the circuits contained in block 18 comprising a teletype carriage return character followed by the call sign of station A, which is fed through the OR-gate 10 into the teletype signal path and thence to block 6. The output from block 6 is fed through a "three-input" AND-gate 5, a transmit power amplifier 2, and an aerial 1 and thence to station B. Yet another pulse from either bistable 13 or clock 19 is applied through OR-gate 15 and each of delays 14 and 20 via paths 67 and 68 respectively. Delays 14 and 20 delay said pulse for a time long enough to allow transmission from station A of the carriage return character and its call sign. To ensure that when teletype signals are being transmitted only pulses from bistable 13 are fed through OR-gates 16 and 15, switches S1 and S2 are provided in the signal paths from clock 19 to each gate. They are shut during audio transmission and open during either teletype or simultaneous teletype and audio transmission, so that the evaluating means only ever works off teletype signals whenever such signals are being transmitted or directly off the clock 19 whenever just audio signals are being transmitted. The pulse from delay 14 is fed to reset and carrier select circuits 11 and 28 via paths 69 and 71 respectively which reset the tuning of the transmitter and receiver at station A to suit the highest of the *n* available carrier frequencies say *na* and *nb* respectively.

Referring now to FIG. 2, at station B the carrier wave previously in use at station A is received by aerial 48 and receive amplifier 49, and is passed to a block 50 which includes frequency translating means which is fed with carrier frequencies 1*a* to *na* from a bank of oscillators 51. Teletype and audio signals are fed from outputs 54 and 53 respectively and the teletype signals are passed both to a detector 55 and a teletypewriter. Reception of the carrier wave previously in use at station A of the carriage return character and the call sign causes the station A call sign to be printed by the teletypewriter, and detector 55 to provide a pulse from an output 56, which is delayed through a delay 59 for a time sufficient to allow the transmitter at station B to finish transmitting the current teletype character, which causes reset and carrier select circuits 47 and 52 to reset the tuning of the transmitter and receiver at station B to suit the highest of the *n* available carrier frequencies say *nb* and *na* respectively.

After a time sufficient to allow all necessary changes to be effected the transmitter at station A transmits at reduced power compared with normal communication a test frequency signal comprising three characters of 21 bits, by modulation of the carrier frequency *na*. This is achieved as follows referring back to FIG. 1. The pulse from delay 14 shuts gate 5 and opens a gate 4 via path 70; and the pulse from delay 20 is fed through an OR-gate 21 to a trigger circuit 22, which triggers an output from the circuits contained in block 23 comprising three characters of 21 bits which are fed through OR-gate 10 into the teletype signal path and thence to block 6. The subsequent output from block 6 is thus passed through gate 4 and an attenuator 3 before the transmit power amplifier 2, so that the signal from aerial 1 at a carrier frequency of *na* modulated with three characters of 21 bits is transmitted at reduced power, say half power. Alternatively if amplifier 2 has automatic gain control then said pulse from delay 14 can be arranged to switch extra or less voltage as required to the automatic gain control voltage so as to reduce the transmitted power. This signal at reduced power is received by station B, the received teletype signal switched from the receiver to the transmitter and retransmitted to station A, again at the reduced power but on the carrier frequency of *nb*.

Referring back to FIG. 2, when detector 55 detects the signal of three characters of 21 bits, it provides a pulse via path 71 from an output 57 which opens a "three-input" AND-gate 60, so that the signal of three characters of 21 bits is fed through gate 60 to the input of the transmit path of station B via paths 76 and 77 where it is applied at an input 72 of a block 45 which includes frequency translating means and which is fed with carrier frequencies 1*b* to *nb* from a bank of oscillators 46. In normal operation signals from block 45 are fed through a "three-input" AND-gate 44, transmit power amplifier 41 and aerial 40 and thence to station A; however in this case another pulse from output 57 of detector 55, shuts gate 44 and opens a "three-input" AND-gate 43 via path 73 so that the signal is passed first through an attenuator 42, so that transmission from aerial 40 takes place at a reduced power. Again an alternative is to arrange for said pulse to apply extra or less automatic gain control voltage to transmit power amplifier 41.

Referring again to FIG. 1, signals at reduced power from station B at a carrier frequency of *nb* are received at station A by aerial 24 and are passed through a receiver amplifier 25 to block 26 which includes frequency-translating means which is fed with frequencies in the range 1*b* to *nb* from a bank of oscillators 27. The received signal of three characters of 21 bits is fed from an output 30 to a detector circuit 31 wherein, if a satisfactory signal to noise ratio is detected, indicating that the propagation path is satisfactory for the pair of frequencies *na* and *nb*, then a pulse from an output 32 of detector 31 is provided to open gate 5 and close gate 4; open gates 8 and 9; and fire a trigger circuit 34 which triggers an output from the circuits contained in a block 35 comprising two characters of 14 bits which are fed through gate 10 into the teletype signal path. Thus a transmission occurs at full power of a signal of two characters of 14 bits which acts as an instruction to station B to stop its evaluation and resume normal reception on carrier frequency *na* and transmission on carrier frequency *nb*. This is achieved as follows referring to FIG. 2. On detecting the signal of two characters of 14 bits, detector 55 provides a pulse from an output 58 to shut gate 60, open gate 44 and shut gate 43.

If detector 31 of station A does not detect satisfactory re-reception of the signal from station B at reduced power, then referring to FIG. 1, it provides a pulse from another output 33 to carrier select circuits 11 and 28 so that they select the pair of frequencies $(n-1)a$ and $(n-1)b$ respectively, and to trigger circuit 22 via OR-gate 21 so that another signal of three characters of 21 bits is transmitted at reduced power to station B, where if detector 55 of FIG. 2 again detects three characters of 21 bits, it this time not only arranges for them to be retransmitted, but also provides a pulse so that carrier select circuits 47 and 52 select the pair of frequencies $(n-1)b$ and $(n-1)$respectively. This procedure of transmission and retransmission continues until a satisfactory pair of frequencies is determined.

This procedure ensures that the highest of the *n* available pairs of frequencies will be selected, the highest frequencies having in most circumstances the least multipath time spread. The procedure also ensures that normal communication is interrupted for the minimum time, the average interruption lasting about 4 seconds, if eight frequency pairs are available.

If the frequency evaluation continues at station A to the lowest frequency pair without finding satisfactory carrier frequencies, means are provided to produce a signal which signifies a "communication out" condition. A similar signal is set up at station B if the 2×14 bit "stop test" signal is not received within a preset time. The "communication out" signal at each station causes a suitable signal to be displayed to the operator and also initiates operation of automatic search means. This is achieved as follows referring first to FIG. 1. As soon as a pulse from OR-gate 21 initiates the evaluating means, it also sets a bistable 36 so that it provides a pulse to start a counter 37; similarly in FIG. 2 the pulse from delay 59 also sets a bistable 61 via path 75 so that it provides a pulse to start a counter 62. As soon as detector 31 of FIG. 1 indicates satisfactory re-reception by means of a pulse from its output 32, said pulse also clears bistable 36 so that it stops counter 37; similarly in FIG. 2, as soon as detector 55 indicates the reception of the signal of 2 characters of 14 bits by means of a pulse from its output 58, said pulse clears bistable 61 via path 74 so that counter 62 is stopped. If however a satisfactory pair of adjacent frequencies is not selected within a preset time, then counters 37 and 62 trigger alarm means via paths 38 and 63 respectively so as to indicate a "communication out" condition. Thereupon they also provide pulses to carrier select circuits 39 and 64 respectively so that they sequentially select each in turn of the *n* frequency pairs which are available at their respective station, and for this purpose can include for example ring counters. At station B the transmitter and the receiver are switched by carrier select circuit 64 in repetitive sequence to each of the *n* frequency pairs which are available, in the same manner as for the normal evaluating process except that the stepping from one frequency pair to the next occurs at twice the normal test rate (say 1 channel per 2 seconds). However at station A, the transmitter and the receiver are switched by carrier select circuit 39 from one pair of frequencies to another at a much slower rate. For example $(2n)$ frequency test signals are transmitted in succession at each carrier frequency for station A, and the rate of stepping from one frequency pair to another at station A is reduced by the same factor $(2n)$. Therefore, at station A, the transmitter transmits and the receiver listens on the respective frequencies of each pair for a period long enough to allow the transmitter and receiver at B to step through all the available pairs of carrier frequencies, eliminating the need for sychronization. If a correctly coded test signal is returned to and satisfactorily received at station A, then the system responds in the same way as during normal frequency evaluation, the circuits being returned to normal communication conditions. A complete search cycle, in "communication out" conditions may occupy about 64 seconds.

At each station the transmitting and receiving antenna preferably have directional characteristics to increase sensitivity and to reduce cross coupling between transmitter and receiver. Each receiving antenna may be of the construction described in copending U.S. application No. 674,478 and in this case the receiving antenna may be orientated with its null axis pointing towards the transmitting antenna.

In some cases two differently polarized receiving antenna and two separate receivers may be employed for polarization diversity operation.

The transmitter and receiver for each station may be located on a site remote from the teletypewriters and telephones for generating the teletype and audio signals, being coupled thereto by cable. In this case the transmitters and receivers may be entirely automatic, requiring no permanent operating or maintenance staff, and the transmitter and receiver on one site may be housed in common watertight case. Since the invention is especially intended for relatively low power systems, the amplifying devices of the transmitters and the receivers may be entirely solid state devices further reducing the maintenance requirements of the system.

What I claim is:

1. A radio communication system including a transmitter for transmitting a carrier wave modulated by intelligence, a receiver for receiving said carrier wave, means for interrupting transmission at intervals, means for determining with the aid of said transmitter and said receiver during the interruptions the optimum frequency for said carrier wave in a range of frequencies, means for switching said carrier wave to said frequency when transmission is resumed, and means for continuing operation of said determining means on inability to determine an optimum frequency, said continuing means comprising means operative for adapting said transmitter to transmit test signals at each of a plurality of discrete frequencies in said range of frequencies taken at one rate, and means operative for rendering the receiver responsive to said plurality of discrete frequencies taken at a substantially different rate, thereby to avoid the need to synchronize the changes in frequency at the transmitter and receiver.

2. A radio communication system including a transmitter for transmitting a carrier wave modulated by intelligence, a receiver for receiving said carrier wave, means for interrupting transmission at intervals, said interrupting means comprising clock means adapted to initiate the interruptions at regular intervals and means for delaying the interruptions until a break occurs in the traffic being transmitted, means for determining with the aid of said transmitter and said receiver during the interruptions the optimum frequency for said carrier wave in a range of frequencies, and means for switching said carrier wave to said frequency when transmission is resumed.

3. A system according to claim 2 wherein said determining means includes means for testing transmission from said transmitter to said receiver at a plurality of discrete carrier frequencies, taken in order beginning at the highest, until a frequency providing adequate communication is found.

4. A system according to claim 3 wherein said means for testing includes means for transmitting a test signal on each of said discrete carrier frequencies, and means for transmitting an answer signal from said receiver to said transmitter on a corresponding but different carrier frequency after the test signal is received by said receiver, and means for terminating the test sequence if the answer signal is adequately received at said transmitter.

5. A system according to claim 4 wherein said determining means includes means for transmitting said test signal from said transmitter at reduced power compared with the power used for normal transmission.

6. A system according to claim 5 wherein said transmitter is associated with a receiver and said receiver is associated with a transmitter, to provide two-way communication, and wherein said determining means includes means for transmitting an answer signal from the second mentioned transmitter to the second mentioned receiver at reduced power compared with the power used for normal communication at said second transmitter.

7. A system according to claim 2 including means for continuing operation of said determining means on inability to determine an optimum frequency.

8. A system according to claim 7 wherein said continuing means comprises means operative for adapting said transmitter to transmit test signals at each of a plurality of discrete frequencies in said range of frequencies taken at one rate, and means operative for rendering the receiver responsive to said plurality of discrete frequencies taken at a substantially different rate, thereby to avoid the need to synchronize the changes in frequency at the transmitter and the receiver.

* * * * *

UNITED STATES PATENT OFFICE

CERTIFICATE OF CORRECTION

Patent No. 3,617,891 Dated November 2, 1971

Inventor(s) Dennis Henry Covill

It is certified that error appears in the above-identified patent and that said Letters Patent are hereby corrected as shown below:

Title page, lines 6 and 7 should read --

[73] Assignee EMI LIMITED
Hayes, Middlesex, England --

Signed and sealed this 11th day of July 1972.

(SEAL)
Attest:

EDWARD M.FLETCHER,JR.
Attesting Officer

ROBERT GOTTSCHALK
Commissioner of Patents